(12) United States Patent
Cheng

(10) Patent No.: US 9,566,592 B1
(45) Date of Patent: Feb. 14, 2017

(54) DUST COLLECTOR ABLE TO PROP OPEN A FALLEN DUST BAG

(71) Applicant: SAN FORD MACHINERY CO., LTD., Taichung (TW)

(72) Inventor: Yuan-Tai Cheng, Taichung (TW)

(73) Assignee: SAN FORD MACHINERY CO., LTD., Taichung (TW)

(*) Notice: Subject to any disclaimer, the term of this patent is extended or adjusted under 35 U.S.C. 154(b) by 0 days.

(21) Appl. No.: 15/174,739

(22) Filed: Jun. 6, 2016

(51) Int. Cl.
*B01D 46/00* (2006.01)
*B04C 5/185* (2006.01)
*B01D 45/18* (2006.01)

(52) U.S. Cl.
CPC .............. *B04C 5/185* (2013.01); *B01D 45/18* (2013.01)

(58) Field of Classification Search
CPC ................... B01D 45/00; B01D 45/12–45/18; B04C 5/185
See application file for complete search history.

(56) References Cited

U.S. PATENT DOCUMENTS

2010/0037572 A1* 2/2010 Cheng ................... A47L 9/1608
55/369

* cited by examiner

*Primary Examiner* — T. Bennett McKenzie
(74) *Attorney, Agent, or Firm* — Ming Chow; Sinorica, LLC

(57) ABSTRACT

A dust collector able to prop open a fallen dust bag is to have a cover plate of a dust bucket bored with an insert hole fixed therein with a hose, which is connected to an air hood. The dust bucket has a circumferential wall inserted with a conduit extending to the cover plate and bored with an opening whose circumferential edge can be pressed by the cover plate to form an air tight state. The hose and the conduit can be combined to form a piping passage for suction to pass therethrough to have the fallen dust bag propped open and stuck to the inner wall of the dust bucket. To clean and replace the fallen dust bag, only remove the dust bucket to let the conduit disengaged from the cover plate and separated from the hose, able to quickly detach the dust bucket from the dust collector.

5 Claims, 7 Drawing Sheets

DUST COLLECTOR ABLE TO PROP OPEN A FALLEN DUST BAG

BACKGROUND OF THE INVENTION

1. Field of the Invention

This invention relates to a dust collector, particularly to one able to prop open a fallen dust bag.

2. Description of the Prior Art

A conventional dust collector able to prop open a fallen dust bag, as shown in FIG. 1, includes an air hood 210 having a peripheral side bored with an air intake 211, an upper side installed with a motor 212 pivotally connected with fan blades 213 received in the air hood 210 and a lower side provided with a first air outlet 214, and the air hood 210 is further bored with a second air outlet 215 at the opposite side of the air intake 211. A dust bucket 220 is provided under the first air outlet 214, having its interior disposed with a fallen dust bag 221, and a dust collecting bag 230 is positioned at the outer side of the second air outlet 215. In addition, a hose 240 has one end inserted through a lower circumferential wall of the dust bucket 220 and another end extending to the air hood 210 and inserted in the air hood 210. Thus, when the motor 212 is started to drive the fan blades 213 to rotate, suction will be produced to the air intake 211 and also to the fallen dust bag 221 in the dust bucket 220 via the hose 240 to enable the fallen dust bag 221 to be propped open and stuck to the inner circumferential wall of the dust bucket 220.

When the dust collector has been used for a long time, the dust bucket 220 will be full of dust and has to be cleaned or replaced. At this time, the dust bucket 220 has to be detached from the dust collector for facilitating cleaning and replacing of the fallen dust bag 221. In order to avoid pulling and dragging the hose 240 and causing damage in the process of removal of the dust bucket 220 and in the course of cleaning and replacing of the fallen dust bag 221, the hose 240 must be removed first before detaching the dust bucket 220 from the dust collector. However, to ensure that the hose 240 can provide good suction, the joint of the hose 240 and the dust bucket 220 is formed with a good airtight state; therefore, an operator has to consume much time and metal energy in removal of the hose 240 and further, the hose 240 is fixed at the lower side of the dust bucket 220 so it is difficult for the operator to carry out removing work of the hose 240, bringing about much criticism.

In view of the drawbacks mentioned above, the inventor of this invention thinks that the conventional dust collector able to prop open a fallen dust bag has to be ameliorated and hence devises this invention.

SUMMARY OF THE INVENTION

The objective of this invention is to offer a dust collector able to prop open a fallen dust bag, enabling an operator to quickly complete installing and detaching work of a dust bucket.

The dust collector able to prop open a fallen dust bag in the present invention is characterized by a cover plate annularly provided at the outer circumferential slide of a first air outlet to be covered on a dust bucket, and the cover plate is larger than the dust bucket in transverse cross-sectional area and further, the cover plate is bored with an insert hole at a location corresponding to an outer side of the dust bucket. A hose has one end connected with an air hood and communicating with the interior of the air hood and another end fixed at the insert hole of the cover plate. A conduit has one end secured at a lower circumferential wall of the dust bucket and communicating with the interior of the dust bucket and another end extending to the insert hole of the cover plate and formed with an opening corresponding with the insert hole of the cover plate. The circumferential edge of the opening of the conduit can be firmly pressed by the cover plate to form an airtight state.

The dust collector able to prop open a fallen dust bag in the present invention is able to provide the fallen dust bag in the dust bucket with good suction through a piping passage formed by combination of the hose with the conduit when the dust bucket is pressed by the cover plate, thus enabling the fallen dust bag to be propped open and stuck to the inner circumferential wall of the dust bucket. To clean or replace the fallen dust bag, only remove the dust bucket from the dust collector to let the conduit disengaged from the cover plate and separated from the hose, thus enabling an operator to quickly complete installing and detaching work of the dust bucket.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
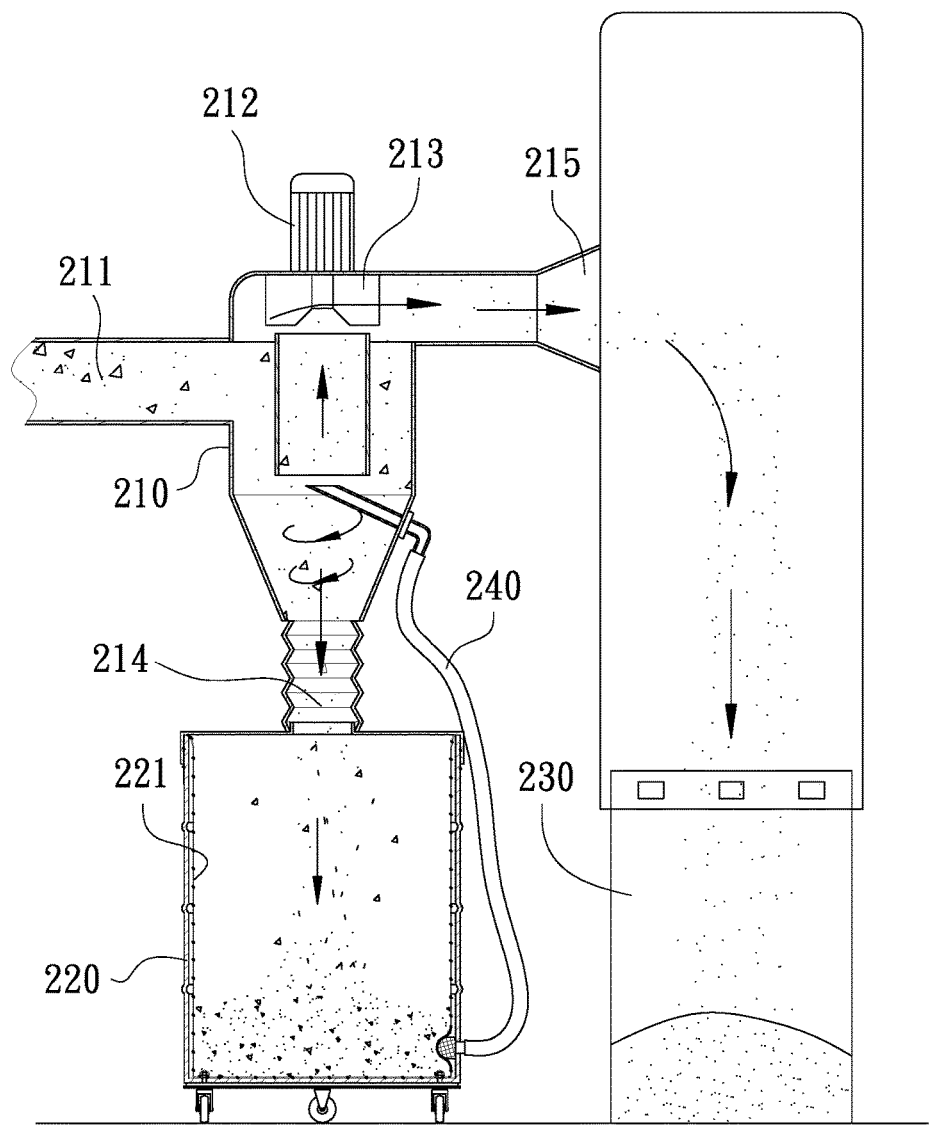
FIG. 1 is a cross-sectional view of a conventional dust collector able to prop open a fallen dust bag.
Figure 2:
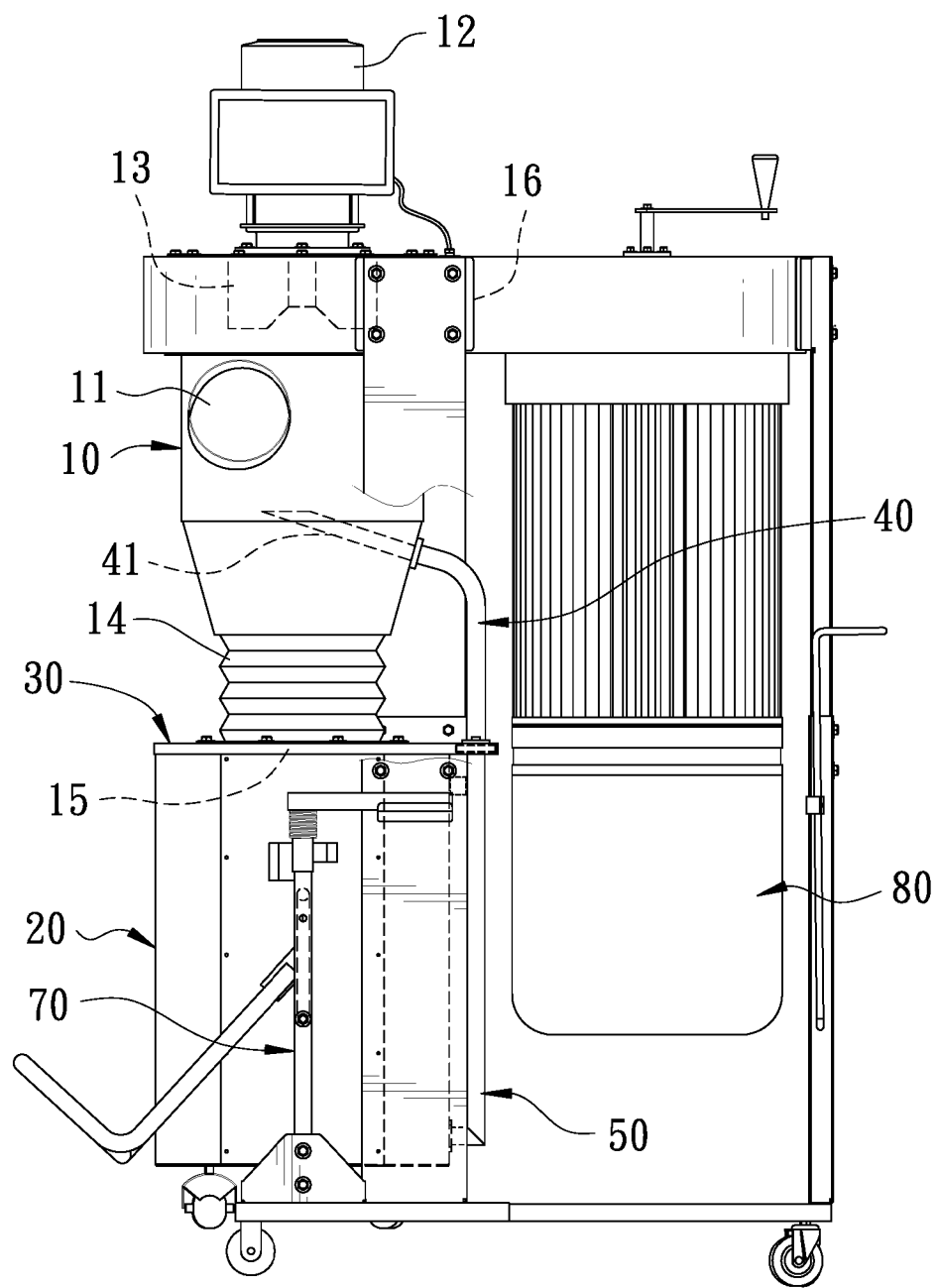
FIG. 2 is a cross-sectional view of a dust collector able to prop open a fallen dust bag in the present invention.
Figure 3:
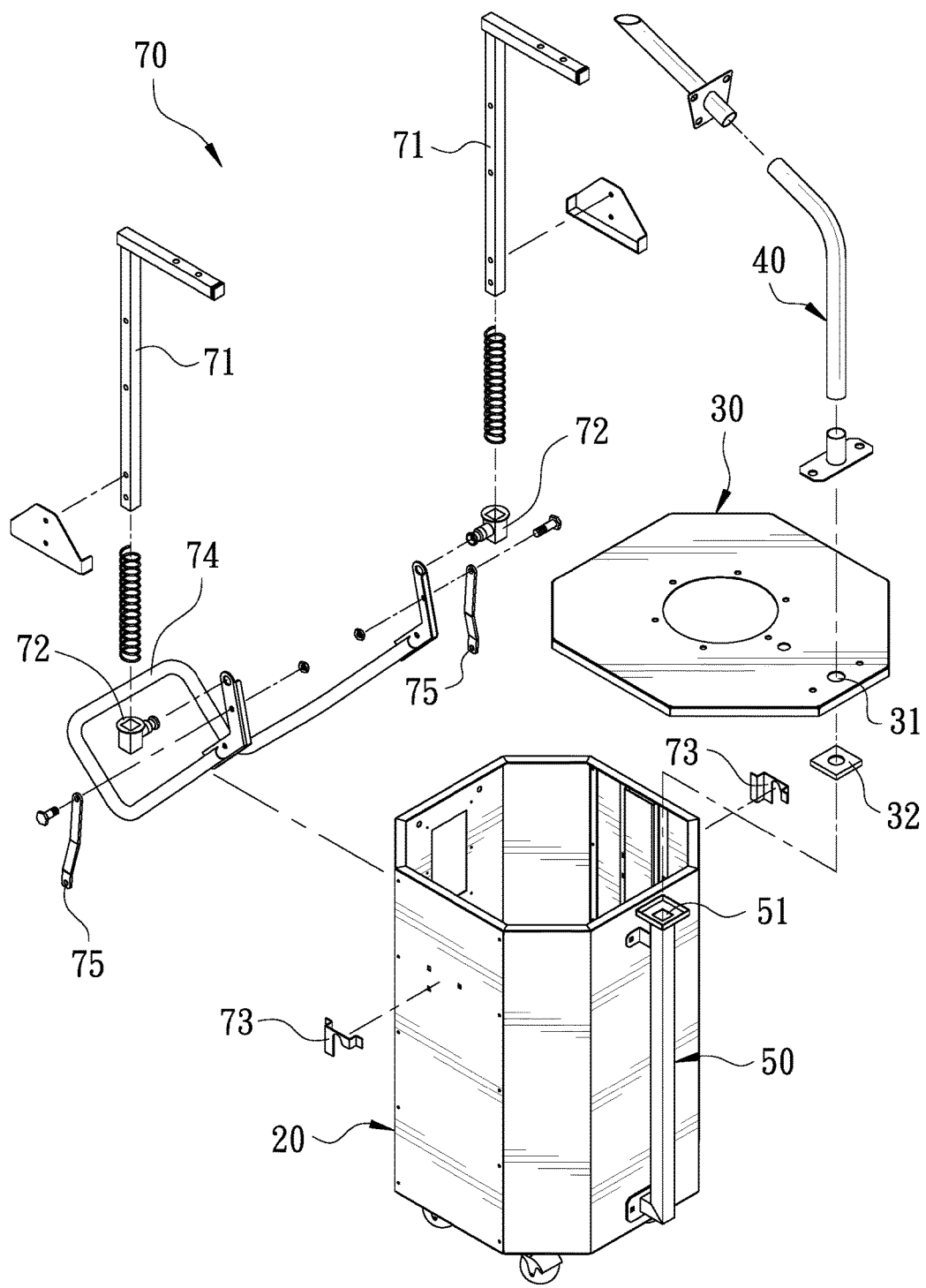
FIG. 3 is a partial exploded perspective view of the dust collector able to prop open a fallen dust bag in the present invention.

A preferred embodiment of a dust collector able to prop open a fallen dust bag in the present invention, as shown in FIGS. 2 and 3, includes an air hood 10, a dust bucket 20, a cover plate 30, a hose 40, a conduit 50, an annular position-limiting plate 60, a dust bucket installing-and-detaching mechanism 70 and a dust collecting bag 80 as main components combined together.

The air hood 10 has its circumferential side formed with an air intake 11 along tangential direction and its topside provided with a motor 12, which is pivotally connected with fan blades 13 received in the air hood 10 for driving the fan blades 13 to rotate. The air hood 10 has its lower side connected with an extension pipe 14 having a lower end bored with a first air outlet 15. The air hood 10 is further bored with a second air outlet 16 at the opposite side of the intake 11.

Figure 7:
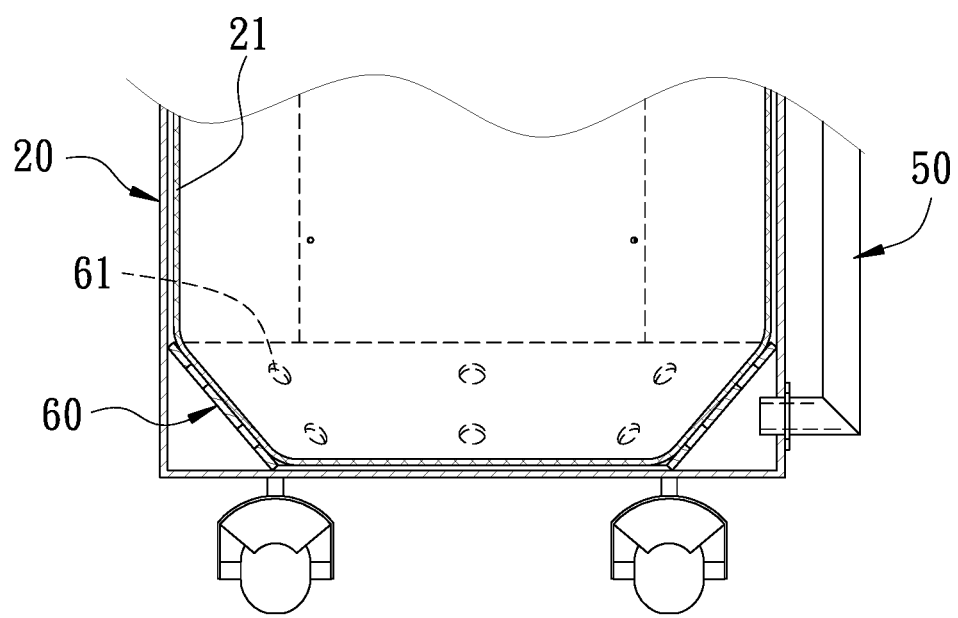
FIG. 7 is a schematic view of the dust collector able to prop open a fallen dust bag in use in the present invention, showing a state that the fallen dust bag is propped open.

The dust bucket 20 is positioned under the first air outlet 15. Referring to FIG. 7, the dust bucket 20 has its interior provided with a fallen dust bag 21 and in this preferred embodiment, the cross-sectional area of the dust bucket 20 is an octagonal shape to enable the dust bucket 20 to form a comparatively good volume.

The cover plate 30 is annularly mounted at the outer circumferential side of the first air outlet 15 and covered on the dust bucket 20, and the cover plate 30 is a little larger than the dust bucket 20 in transverse cross-sectional area. Further, the cover plate 30 is bored with an insert hole 31 at a location corresponding to the outer side of the dust bucket 20 and has its underside annularly provided with a foam plate 32 at the circumferential edge of the insert hole 31.

The hose 40 has one end connected with the air hood 10 and communicating with the interior of the air hood 10 and this end is fitted with an air duct 41, which extends to the lower side of the fan blades 13. The hose 40 has another end fixed at the location of the insert hole 31 of the cover plate 30.

The conduit 50 has one end secured at a lower circumferential wall of the dust bucket 20 and communicating with the interior of the dust bucket 20 and another end extending to the insert hole 31 of the cover plate 30 and bored with an opening 51 corresponding to the insert hole 31 of the cover plate 30, and the circumferential edge of the opening 51 of the conduit 50 can be firmly pressed by the foam plate 32 of the cover plate 30 to form an airtight state.

The annular position-limiting plate 60 is disposed at the inner lower side of the dust bucket 20 and corresponding to the location where the conduit 50 is secured. The position-limiting plate 60 is gradually contracted toward the bottom of the dust bucket 20 to form a space between the position-limiting plate 60 and the location where the conduit 50 is fixed. The position-limiting plate 60 is further bored with a plurality of holes 61 to enable the interior of the dust bucket 20 to communicate with the conduit 50 via the holes 61 of the position-limiting plate 60.

The dust bucket installing-and-detaching mechanism 70 corresponding with the dust bucket 20 is set beneath the cover plate 30, consisting of two support rods 71 respectively secured under two sides of the cover plate 30, and exactly and correspondingly positioned at two sides of the dust bucket 20. The two support rods 71 are respectively fitted thereon with a slider 72, and the dust bucket 20 has two sides respectively fixed thereon with a positioning member 73 corresponding to the support rods 71 for positioning the slider 72 at the location of the positioning member 73. In addition, the sliders 72 are respectively and pivotally provided with an operating lever 74, which is pivotally connected with a position-limiting rod 75 corresponding with the support rod 71 and having one end pivotally connected with the support rod 71.

The dust collecting bag 80 is positioned at the outer side of the second air outlet 16.

Figure 4:
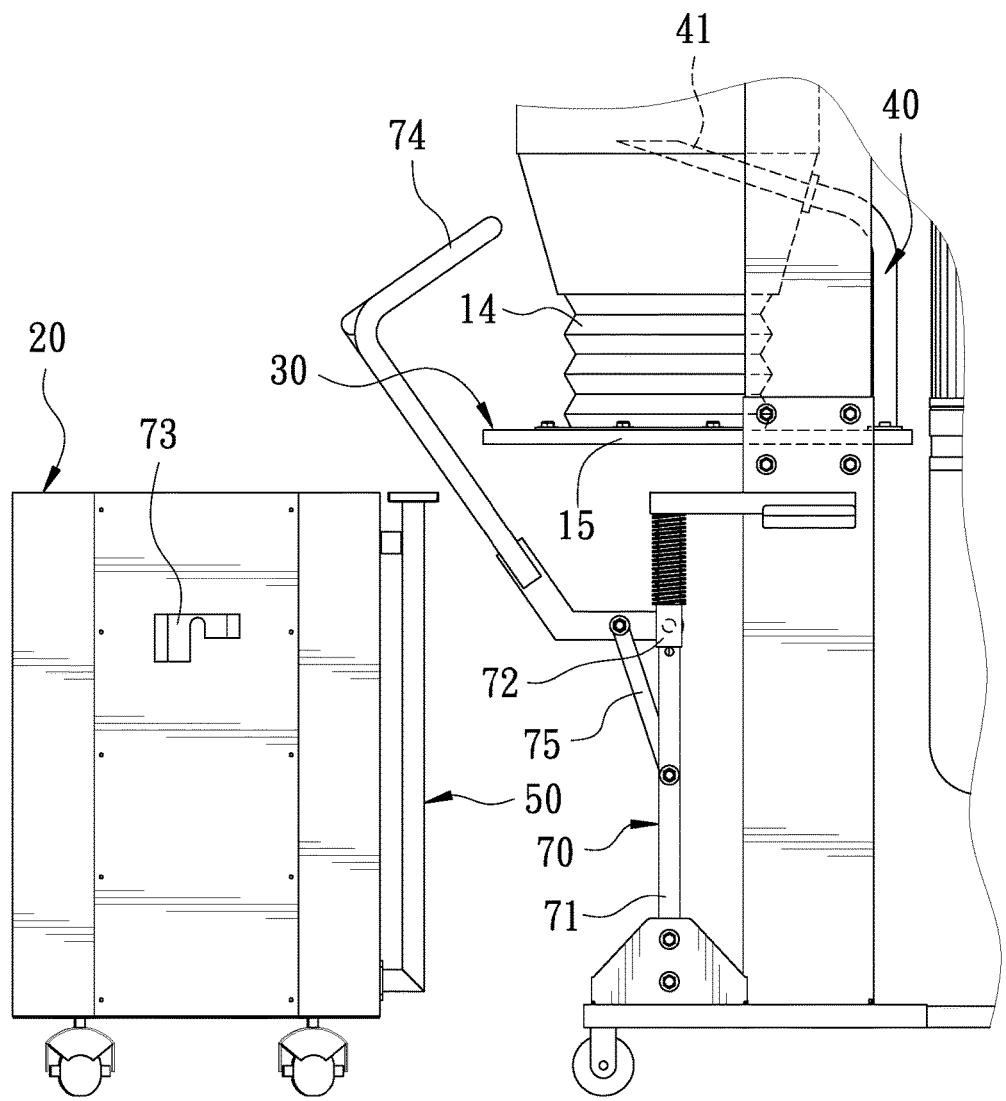
FIG. 4 is a schematic view of the dust collector able to prop open a fallen dust bag in use in the present invention, showing a state before a dust bucket is combined with a dust collector.
Figure 5:
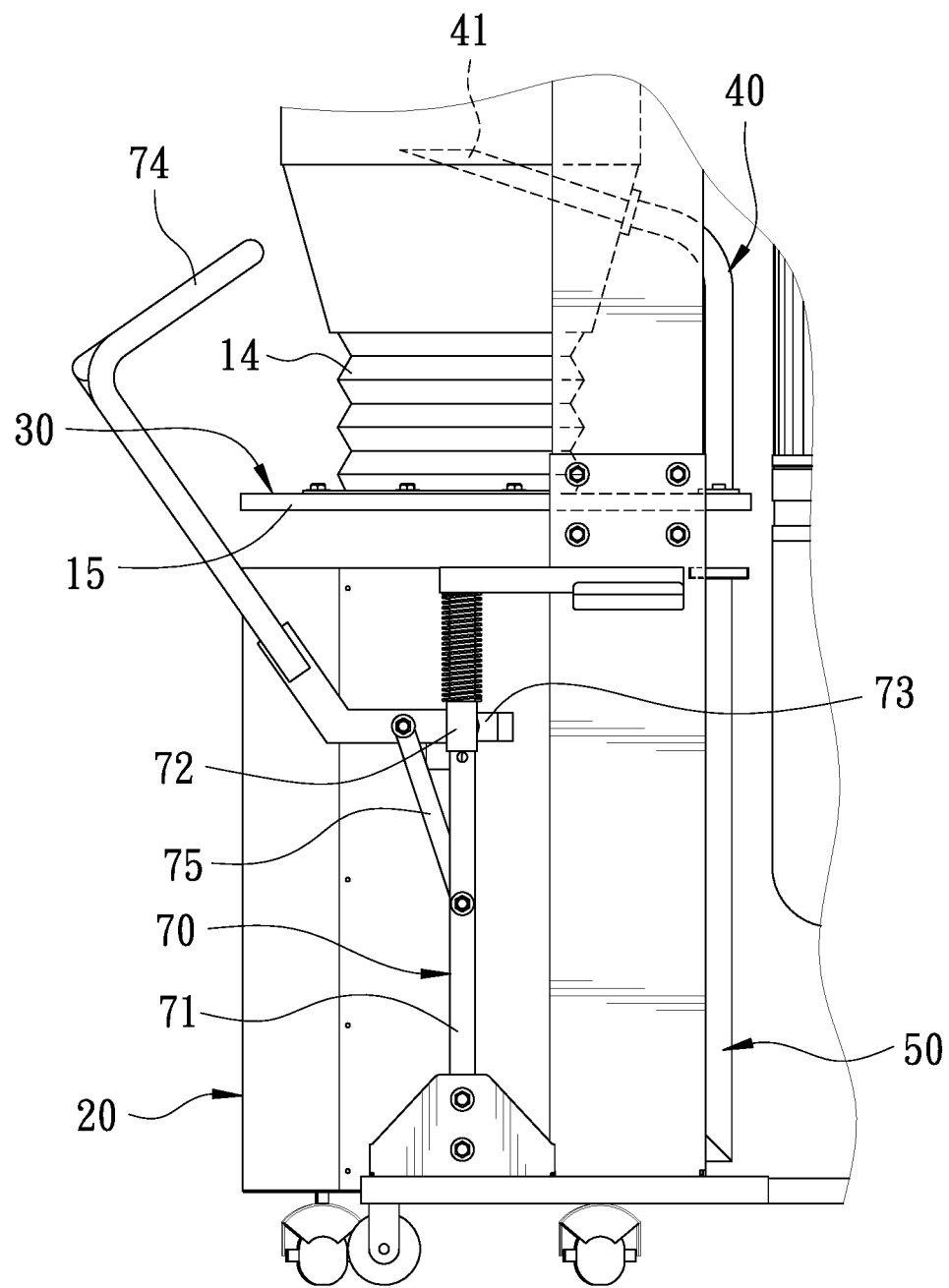
FIG. 5 is a schematic view of the dust collector able to prop open a fallen dust bag in use in the present invention, showing a state that the dust bucket is combined with a dust bucket installing-and-detaching mechanism but not yet connected with the dust collector.
Figure 6:
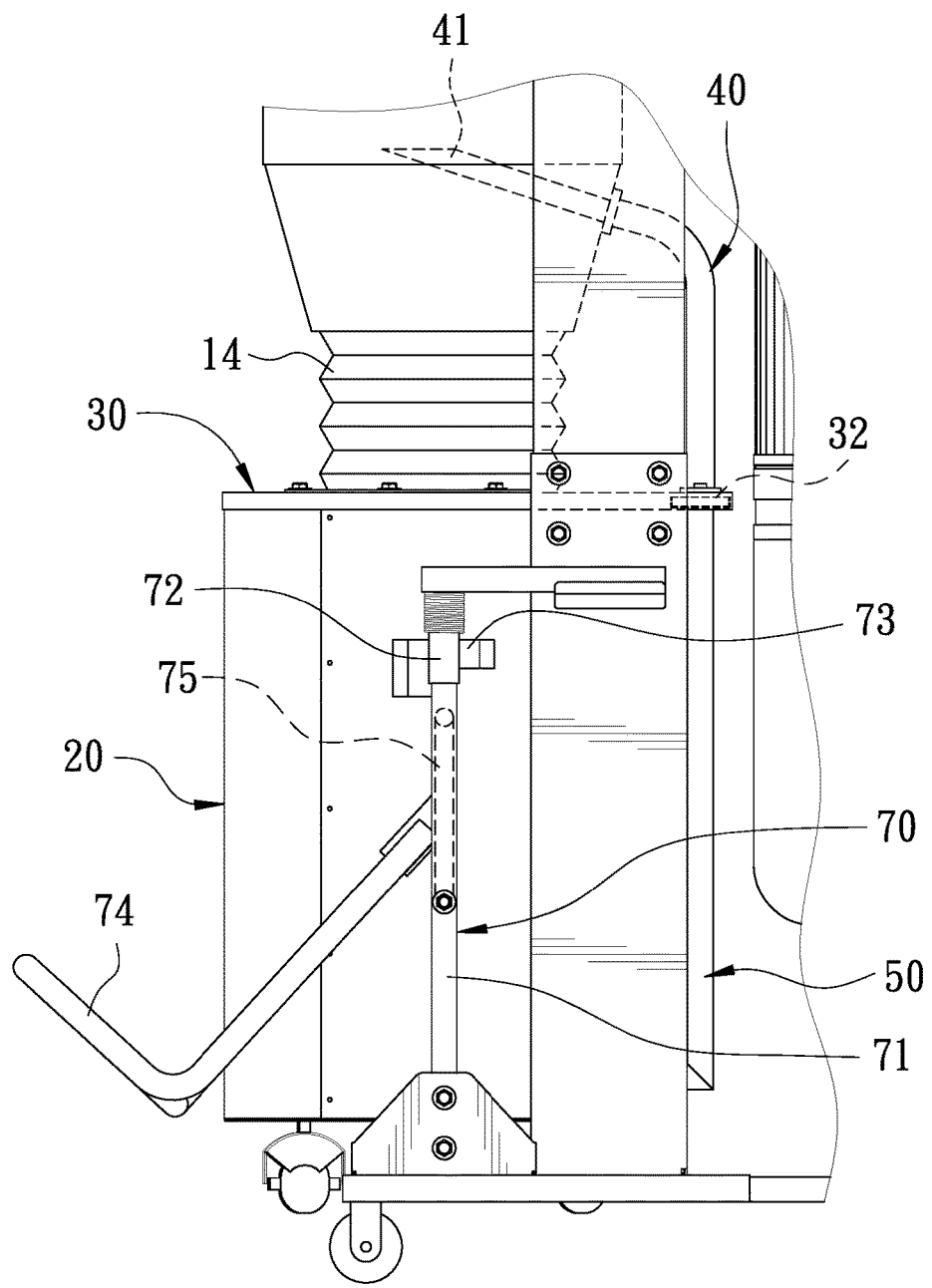
FIG. 6 is a schematic view of the dust collector able to prop open a fallen dust bag in use in the present invention, showing a state that the dust bucket is combined together with the dust collector.

To install the dust bucket 20 onto the dust collector, referring to FIGS. 4-6, only pull up the operating lever 74 and have the dust bucket 20 corresponding to the dust bucket installing-and-detaching mechanism 70 and pushed to be positioned under the cover plate 30 to let the positioning member 73 at two side walls of the dust bucket 20 positioned at the sliders 72. Then, press down the operating lever 74 to actuate the sliders 72 to move upward along the support rods 71 for moving up the dust bucket 20, letting the dust bucket 20 resist against the underside of the cover plate 30. When the dust bucket installing-and-detaching mechanism 70 actuates the dust bucket 20 to move upward, the position-limiting rods 75 will be turned together with the operating lever 74, and when the position-limiting rod 75 is turned to parallel the support rod 71, the position-limiting rod 75 and the slider 72 will be positioned collinearly, letting the dust bucket installing-and-detaching mechanism 70 form a dead point state because of toggle effect. Thus, after an operator releases the operating lever 74 and has the operating lever 74 fixed in place, the dust bucket 20 can be closely combined with the underside of the cover plate 30, thus finishing installation of the dust bucket 20.

When the dust bucket 20 is finished installing, the opening 51 of the conduit 50 will coincide with the hose 40, letting the hose 40 and the conduit 50 combined to form a piping passage. At this time, since the dust bucket 20 is pressed by the cover plate 30, and the circumferential edge of the opening 51 of the conduit 50 is pressed by the foam plate 32 of the cover plate 30 to form an airtight state; therefore, when the motor 12 is started to drive the fan blades 13 to rotate, suction will be produced not only to the air intake 11 but also to the fallen dust bag 21 via the piping passage formed by the hose 40 and the conduit 50, thus enabling the fallen dust bag 21 to be propped open and stuck to the inner circumferential wall of the dust bucket 20.

To remove the dust bucket 20 from the dust collector, simply pull up the operating lever 74 to actuate the position-limiting rod 75 to rotate, and when the position-limiting rod 75 is actuated to move away from the side of the support rod 71 and is no longer parallel to the support rod 71, the dust bucket installing-and-detaching mechanism 70 will get rid of dead point to enable the sliders 72 to slide downward along the support rod 71 and thus, the dust bucket 20 can be disengaged from the cover plate 30 to complete detaching the dust bucket 20 from the dust collector.

When the dust bucket 20 is disengaged from the cover plate 30, the conduit 50 will be separated from the hose 40. Thus, an operator can easily and quickly remove the dust bucket 20 from the dust collector and carry out cleaning and replacing work of the fallen dust bag 21.

Referring to FIG. 7, since the dust bucket 20 has its inner lower side provided with the position-limiting plate 60 that are bored with a plurality of holes 61; therefore, when the motor 12 is started to produce suction to the interior of the dust bucket 20 through the piping passage formed by combination of the hose 40 with the conduit 50, the suction enables the fallen dust bag 21 to be stuck to the position-limiting plate 60 via the holes 61. By so designing, the fallen dust bag 21 can be closely stuck to the position-limiting plate 60 at the inner lower side of the dust bucket 20 to prevent the fallen dust bag 21 from being directly sucked into the conduit 50 to affect the suction transmitted to the interior of the dust bucket 20 or render dust impossible to fall smoothly, thus enhancing effect of sucking and fixing the fallen dust bag 21.

The characteristics and the attainable expected effects of this invention are stated as follows:

The dust collector able to prop open a fallen dust bag in the present invention is able to provide the fallen dust bag 21 in the dust bucket 20 with good suction via the piping passage formed by combination of the hose 40 with the conduit 50 when the dust bucket 20 is closely pressed by the cover plate 30 so that the fallen dust bag can be propped open and stuck to the inner circumferential wall of the dust bucket 20. To clean or replace the fallen dust bag 21, an operator needs only to detach the dust bucket 20 from the dust collector to let the conduit 50 disengaged from the cover plate 30 and separated from the hose 40 and thus, the operator can quickly complete detaching work of the dust bucket 20.

While the preferred embodiment of the invention has been described above, it will be recognized and understood that various modifications may be made therein and the appended claims are intended to cover all such modifications that may fall within the spirit and scope of the invention.

What is claimed is:

1. A dust collector able to prop open a fallen dust bag comprising an air hood, said air hood having a peripheral side bored with an air intake, said air hood having a topside installed with a motor, said motor pivotally connected with fan blades received in said air hood, said air hood having a bottom side bored with a first air outlet, said air hood having an opposite side of said air intake provided with a second air outlet, a cover plate annularly provided at an outer circumferential side of said first air outlet, a dust bucket positioned under said first air outlet and corresponding with said cover plate, a fallen dust bag received in said dust bucket, a dust collecting bag disposed at an outer side of said second air outlet; and characterized by said cover plate being larger than said dust bucket in transverse cross-sectional area, said cover plate bored with an insert hole at a location corresponding to an outer side of said dust bucket;

a hose having one end connected with said air hood and communicating with the interior of said air hood, said air hood having another end secured at said insert hole of said cover plate; and a conduit having one end fixed at a lower circumferential wall of said dust bucket and communicating with the interior of said dust bucket, said conduit having another end extending to said insert hole of said cover plate, said conduit formed with an opening corresponding to said insert hole of said cover plate, the circumferential edge of said opening of said conduit able to be pressed by said cover plate to form an airtight state;

thus, said opening of said conduit corresponding with said hose via said insert hole of said cover plate to enable said hose and said conduit to be combined to form a piping passage when said cover plate is covered on said dust bucket, said motor started to drive said fan blades to rotate and produce suction to said fallen dust bag in said dust bucket through the piping passage formed by said hose and said conduit, said fallen dust bag propped open and stuck to the inner circumferential wall of said dust bucket.

2. The dust collector able to prop open a fallen dust bag as claimed in claim 1, wherein said cover plate has an underside provided with a foam plate at a location corresponding to said opening of said conduit.

3. The dust collector able to prop open a fallen dust bag as claimed in claim 1, wherein an annular positioning-limiting plate is mounted at an inner lower side of said dust bucket, said position-limiting plate contracted gradually toward the bottom of said dust bucket, said conduit firmly fixed at a lower circumferential wall of said dust bucket at a location corresponding with said positioning-limiting plate.

4. The dust collector able to prop open a fallen dust bag as claimed in claim 3, wherein said positioning-limiting plate is bored with a plurality of holes.

5. The dust collector able to prop open a fallen dust bag as claimed in claim 1, wherein a dust bucket installing-and-detaching mechanism corresponding to said dust bucket is provided under said cover plate, said dust bucket installing-and-detaching mechanism operated to move up said dust bucket to have said dust bucket closely combined with an underside of said cover plate.

* * * * *